July 3, 1956

T. R. LAWALL 2,752,697

FIRST AID INSTRUCTION DOLL

Filed Feb. 9, 1955

Thomas R. Lawall
INVENTOR.

July 3, 1956     T. R. LAWALL     2,752,697
FIRST AID INSTRUCTION DOLL

Filed Feb. 9, 1955     2 Sheets-Sheet 2

Thomas R. Lawall
INVENTOR.

BY *Clarence A. O'Brien*
*and Harvey B. Jacobson*
Attorneys

United States Patent Office 2,752,697
Patented July 3, 1956

2,752,697
FIRST AID INSTRUCTION DOLL
Thomas R. Lawall, Catasauqua, Pa.
Application February 9, 1955, Serial No. 487,012
9 Claims. (Cl. 35—17)

This invention relates generally to devices utilized in teaching first aid, and is more particularly concerned in providing a doll simulating a human body wherein the student of first aid has available means to be utilized in teaching the various pressure points utilized to prevent arterial bleeding from open wounds in the human body.

An additional object of invention in conformance with that set forth above is to provide a first aid instruction doll including simulated bone structure conforming to a human body, simulated wounds in said doll from which a liquid simulating blood will flow, as well as providing simulated pressure points conforming to those found on human body wherein said pressure points may be utilized to impede the flow of the simulated blood from the aforementioned simulated wounds.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
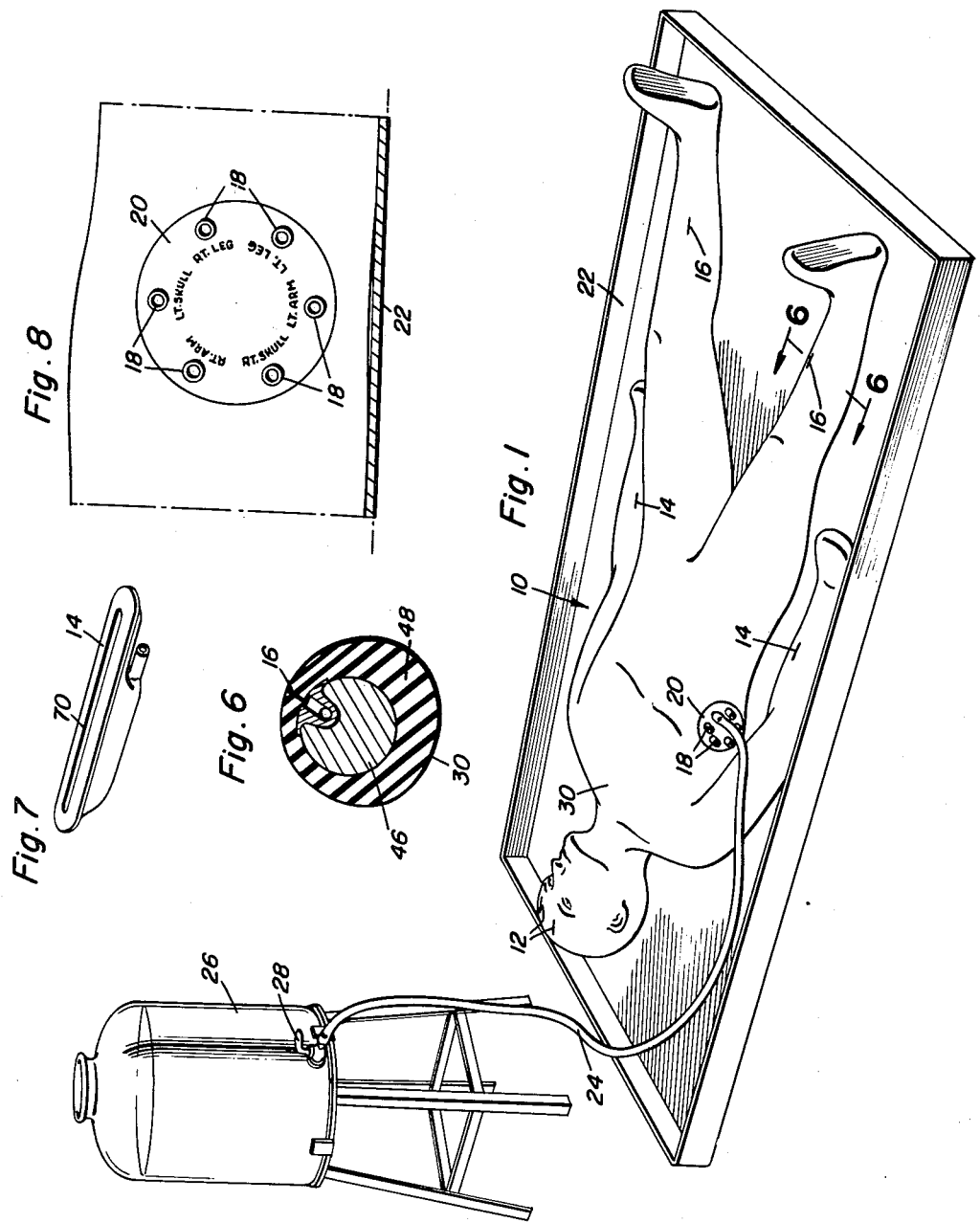
Figure 1 is a perspective view of the novel first aid doll shown in a suitable liquid retaining tray, and connected to a suitable source of supply of liquid for simulating human blood.
Figure 3:
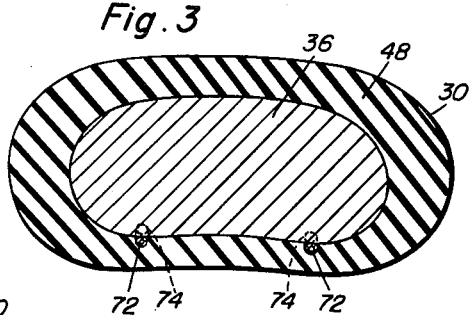
Figure 4:
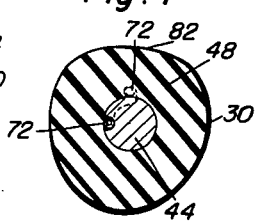
Figure 5:
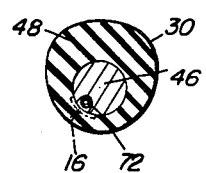
Figures 9, 10:
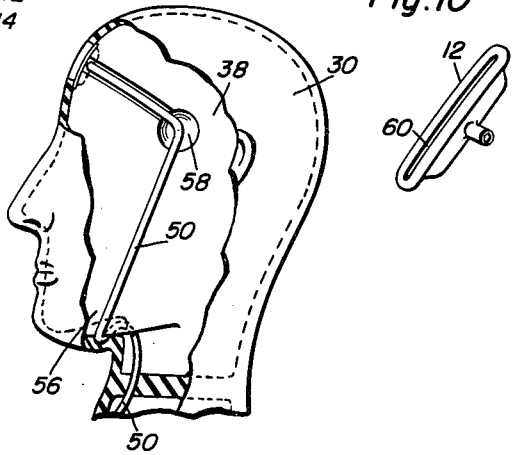
Figure 11:
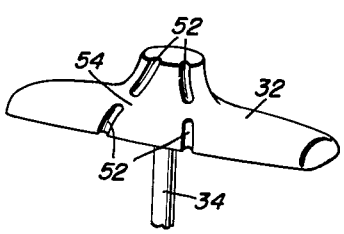

Figures 3, 4 and 5, are enlarged sectional views taken substantially on lines 3—3, 4—4 and 5—5 of Figure 1;

Figure 6 is an enlarged sectional view taken substantially on line 6—6 of Figure 1;

Figure 7 is an enlarged perspective view of one of the liquid outlet elements utilized in either the legs or arms of the first aid doll for simulating an open wound therein;

Figure 8 is an enlarged side elevational view of the control plate indicating the various openings therein connected to the simulated wounds in the first aid doll, with a portion of the liquid retaining tray upon which the doll rests being shown in section;

Figure 9 is an enlarged side elevational view of the head of the first aid doll, with parts broken away for clarity;

Figure 10 is an enlarged perspective view of another of the liquid outlet elements utilized in the head of the first aid doll for simulating an open wound; and Figure 11 is a perspective view of the simulated shoulder bone structure of the first aid doll.

Although this invention is being described as a first aid doll, it is to be understood that said doll is not restricted to any particular size and could be a life-like replica of the human anatomy.

Indicated generally at 10 is a first aid doll which conforms to the anatomy of a human body, said doll including open liquid outlet portions 12, 14 and 16, in the head, arms and legs, respectively, each of said openings being in communication through suitable liquid conduits to be subsequently described, said conduits being in communication with a plurality of inlet nipples 18 retained on a suitable indicia plate 20 indicating which nipple is connected to which liquid outlet.

As seen in Figure 1, a suitable liquid retaining tray 22 is provided for catching the simulated blood therein, and the nipples 18 may be secured by means of a flexible tubing 24 to a source of liquid 26 which includes the conventional control valve 28 as clearly illustrated therein. The liquid may be colored red for more closely simulating actual blood.

To more closely simulate the human body the doll may be comprised of an outer skin of hollow rubber latex, such as that commonly used for children's life-like play dolls, the bone structure to be presently described may be made of plastic or any other suitable material. The material extending between the bone structure and the simulated outer skin may be of a foam rubber or any other suitable material. The tubing to be utilized for conducting the liquid from the nipples 18 to be simulated open wounds will be a flexible rubber or any other suitable material.

Figure 2:
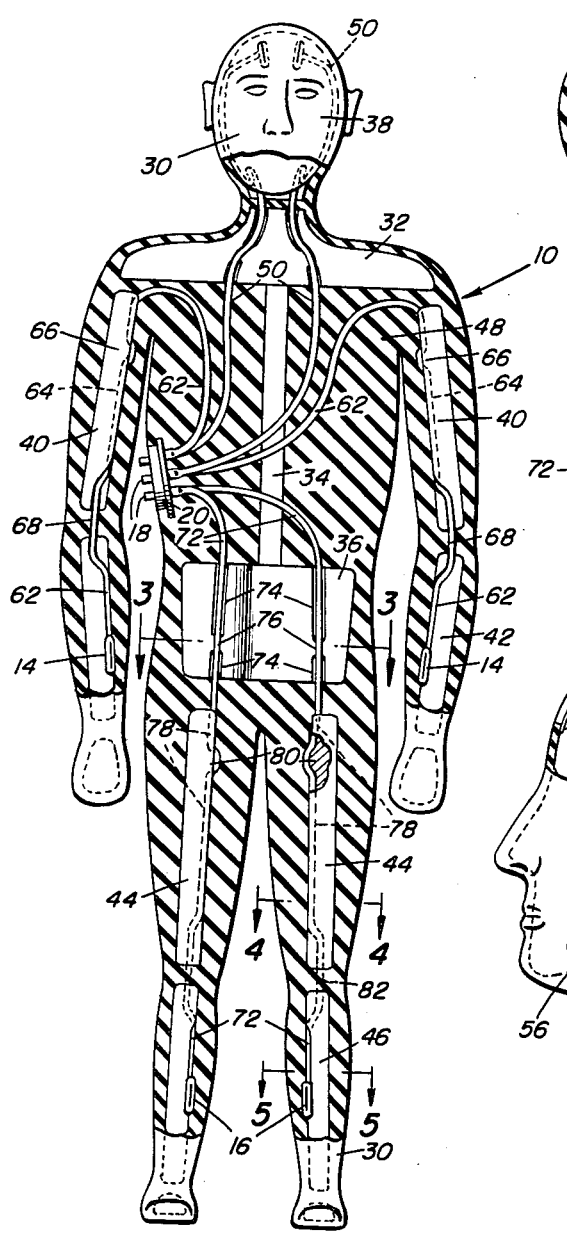
Figure 2 is an enlarged vertical sectional view through the first aid doll, with parts broken away for clarity.

In considering Figure 2, the doll 10 includes the heretofore mentioned outer skin 30 which completely covers the first aid doll, which includes, the structure to be hereinafter described. The first aid doll includes the simulated shoulder bone structure 32 suitably connected by means of a rod element to simulated pelvic bone structure 36, further including a simulated skull 38, simulated arm and forearm bone structure 40 and 42, respectively, and thigh and leg bone structure 44 and 46, respectively. Included between the aforementioned simulated bone structure and the outer simulated skin 30 is a suitable material 48, such as foam rubber, which gives the first aid doll a more realistic feel to the student utilizing the same.

Connected to the inlet nipples 18 are a first pair of flexible fluid conduits 50 which extend upwardly over the forward portion of the shoulder blade structure 32 insertable in suitable grooves 52 contained therein and over the top of the raised portion 54 therebetween and extending upwardly beneath the chin portion 56 of the skull 38 then extending along the outer surface of the skull, as clearly seen in Figure 9, to a central dished out portion 58 simulating the human temple, and finally extending forwardly along the skull to an outlet opening 12, said outlet opening comprising an elongated element having a longitudinal slot 60 from which the simulated blood will flow. The portions of the tube 50 which extend over the portion 54 of the shoulder bone structure will constitute a pressure point between the inlet nipples 18 and the open slots of the outlet elements 12 simulating the open wound, accordingly, pressure applied thereon will prevent the flow from the inlet nipple and out of the simulated wound. Likewise, the portion of the tube 50 which passes beneath the simulated jaw bone structure 56 will constitute another pressure point for stopping flow through the conduit 50 through the outlet element 12, and the simulated temple portion 58 will constitute another pressure point for accomplishing the aforementioned stoppage of flow of liquid through the conduit 50.

A second pair of conduits 62 extend within the body of the first aid doll from the inlet nipples 18 pass along the portion of the simulated arm bone structure 40 adjacent the body of the first aid doll, said conduit being contained within said bone structure in suitable grooves 64 then passing on top of a raised portion 66 thereof, said conduit 62 extending downwardly from the simulated arm bone structure 40. Adjacent the surface of the skin opposite that portion 68 which simulates the portion of the arm opposite the elbow, said conduit 62 terminating in a suitable liquid outlet 14 which includes an elongated slotted portion 70 opening through the surface of the simulated skin. Thus, the portion 66 constitutes one pressure point for stopping the flow of liquid through the conduit 62 from the inlet nipple 18 out of the outlet 14, and by inserting pressure on the portion 68 which constitutes an additional pressure point, stoppage of flow may be impeded in a similar manner.

Another pair of fluid conduits 72 extend from the inlet nipples 18 on top of the simulated pelvic bone structure 36 in suitable grooves 74 contained therein and passing over the top of abutment portion 76, said conduits 72 extend on the inside portion of the simulated thigh bone structure 44 in suitable grooves 78 extending over a raised portion 80 thereon, and then extending behind said simulated bone structure 44 to the leg bone structure 46 at a position adjacent the skin 30 which is on the opposite side of what would normally constitute a knee cap portion of the leg of the human anatomy, and finally communicating with the liquid outlets 16. The outlets 16 will incorporate liquid outlet elements similar to those previously mentioned in regard to the forearms of the first aid doll, and the portion opposite the aforementioned knee cap will be identified by means of reference character 82. The portion 76 on the simulated pelvic bone structure, the portions 80 on the simulated thigh bone structure, and that portion of the tubing identified by reference character 82 will constitute the pressure points for preventing the flow of liquid from the inlet 18 through the conduit 72 and out of the inlet 16.

Although the inlet nipples 18 have been referred to generally, it is to be understood that that inlet identified by the indicia illustrated in Figure 8 will be connected to the source of the liquid supply and controlled by the control valve 28 depending upon which of the liquid outlets is intended to be utilized as simulating an open wound. A student utilizing said device may apply finger pressure, pressure, or a suitable tourniquet at the various indicated pressure points for stopping the flow of liquid through the various conduits.

It is believed readily apparent that the aforementioned structure fully conforms with the objects of the invention heretofore set forth, and provides an extremely practical and highly utilitarian first aid instruction doll for the purposes set forth.

Various positional directional terms such as "front," "rear," etc., are intended herein to have only a relative connotation to aid in describing the device and are not intended to be interpreted as requiring any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed as new is as follows:

1. An anatomical first aid instruction model for teaching the stanching of arterial flow of blood from a wound including a simulated blood circulation system contained in said model, said circulation system including liquid inlet means operable to be connected to a liquid source simulating flow blood through the system, liquid outlet means in communication with said simulated circulatory system for simulating wounds in said model, and simulated pressure point means included in said model operatively associated with said simulated circulatory system for stanching the flow of liquid in said simulated circulatory system and out of said simulated wounds.

2. An anatomical first aid instruction model as set forth in claim 1 wherein said circulatory system comprises a plurality of flexible conduits for applying pressure thereto at the simulated pressure points.

3. An anatomical first aid instruction model as set forth in claim 2 wherein said liquid inlet means comprises separately controlled liquid inlet openings in said model in communication with separate portions of the simulated circulatory system for permitting the flow of a liquid simulating human blood to a remote liquid outlet in said model simulating an open wound, and in which a plurality of pressure points simulating those found on a human body are located in each of the separate portions of the simulated circulatory system.

4. An anatomical first aid instruction model as set forth in claim 1 wherein said simulated pressure point means comprise a flexible liquid conduit forming a part of the simulated circulatory system, said flexible conduit being contained in a portion of the instruction model simulating bone structure, and in which the pressure points consists of a portion of said flexible conduit extending out of the surface of said simulated bone structure.

5. An anatomical first aid instruction model as set forth in claim 1 wherein said simulated pressure points include a flexible conduit constituting a part of the simulated circulatory system, said flexible conduit being located opposite the knee cap portion of the instruction model simulating that of the human body, and wherein pressure applied thereto adjacent said portion opposite said simulated knee cap will stanch the flow of liquid simulating human blood out of said liquid outlets which simulate open wounds.

6. An anatomical first aid instruction model as set forth in claim 1 wherein said simulated pressure point means includes a flexible conduit comprising a portion of the simulated circulatory system, said flexible conduit being located opposite a portion on the instruction model simulating the elbow of a human body wherein pressure applied thereto will stanch the flow of liquid through said simulated circulatory system and out of a simulated wound in communication therewith.

7. An anatomical first aid instruction model as set forth in claim 1 wherein said instruction model includes a simulated skull portion having portions of the simulated circulatory system adjacent thereto, and in which simulated pressure points are included on said simulated skull portion which conform to those found on a human body, wherein pressure applied thereto will stanch the flow through said circulatory system and out of the simulated wounds on said simulated skull portion.

8. An anatomical first aid instruction model as set forth in claim 1 wherein said instruction model includes an outer surface of a pliable material simulating the skin of a human being.

9. An anatomical first aid instruction model as set forth in claim 1 wherein portions of said instructions model simulates skull, shoulder, pelvic, arm, forearm, thigh and leg bone structure, said simulated circulatory system including flexible conduits operatively associated with portions of said simulated bone structure defining simulated pressure points therewith analogous to those found on a human body, said model including a covering simulating human skin, said covering including openings defining simulated wounds which are in communication with said simulated circulatory system.

No references listed.